United States Patent

[11] 3,617,937

[72] Inventors Robert Mazelsky
Monroeville, Pa.;
Robert C. Ohlmann, Palo Alto, Calif.
[21] Appl. No. 843,036
[22] Filed July 18, 1969
[23] Division of Ser. No. 567,918,
July 26, 1966, Pat. No. 3,505,239
[45] Patented Nov. 2, 1971
[73] Assignee Westinghouse Electric Corporation
Pittsburgh, Pa.

[54] LASER CONTAINING NEODYMIUM-DOPED CALCIUM FLUOROAPATITE LASER CRYSTAL
8 Claims, 4 Drawing Figs.

[52] U.S. Cl. .................................................. 331/94.5,
330/4.3, 252/301.4

[51] Int. Cl. .............................................. H01s 3/16,
C09k 1/36
[50] Field of Search. ................................ 252/301.4
331/94.5; 330/4.3

[56] References Cited
UNITED STATES PATENTS
3,432,769 3/1969 Kingsley et al. ............... 331/94.5

Primary Examiner—Tobias E. Levow
Assistant Examiner—R. D. Edmonds
Attorneys—F. Shapoe and L. P. Johns ABSTRACT: A laser having a light source and a cylindrical rod composed of a material having the formula $Ca_{5-x-y-w}Nd_xMn_{y w}(PO_4)_3F_{1-z}0_z$, where $x$ has a value of from 0.001 to 0.2, $y$ has a value of from zero to $x$, $z$ has a value of from zero up to the limit of lattice stability, $w$ has a value of from zero to $x$, and M is at least one of the alkaline earth metals, the rod having parallel ends, and reflective means disposed parallel to each end.

LASER CONTAINING NEODYMIUM-DOPED CALCIUM FLUOROAPATITE LASER CRYSTAL

CROSS-REFERENCE TO RELATED APPLICATIONS

This application is a divisional application of copending application Ser. No. 567,918, filed July 26, 1966, now U.S. Pat. No. 3,505,239.

BACKGROUND OF THE INVENTION

1. Field of the Invention

This invention relates to a crystal laser material and more particularly it pertains to an alkaline earth halophosphate crystal doped with a rare earth element, with or without other dopants and charge compensators.

2. Description of the Prior Art

The use of neodymium as a dopant in a number of crystal lattice materials, to obtain laser action having oscillation at optical or near-optical frequencies is well known. Neodymium associated with chromium is used in yttrium aluminum garnet, lanthanum aluminum oxide, and gadolinium oxides. However, these neodymium-doped crystals, such as yttrium aluminum garnet (commonly referred to as YAG:Nd) have not been completely satisfactory for us in low-threshold pulse or continuous wave laser operation.

Likewise, other desirable characteristics of a laser crystal such as low threshold power, high gain, and optical transparency to pumping and laser wavelengths, are not all obtained concurrently with high efficiency in those prior known laser materials. Accordingly, there is a critical limitation on the efficiency of optically pumping solid laser as well as on obtaining continuous wave operation.

SUMMARY OF THE INVENTION

In accordance with this invention, it has been found that some of the foregoing disadvantages may be overcome by providing a host fluorapatite material which is doped with neodymium or any other rare earth metal having a partially filled $4f$ electronic shell as a partial substitute for calcium. Such host material when doped with neodymium has a high gain and a lower threshold which exceeds the best existing materials.

Accordingly, it is a general object of this invention to provide a crystal laser material having low pulse threshold and which is suitable for continuous wave laser operation.

It is another object of this invention to provide a crystal laser material having a high gain and higher efficiencies than prior known host materials.

Finally, it is an object of this invention to satisfy the foregoing objects and desiderata in a simple and expedient manner.

Briefly, the present invention involves a crystalline laser material which is composed of calcium fluorapatite (calcium fluorophosphate) and which is doped with neodymium as a partial substitute for the calcium therein, hereinafter referred to as FAP:Nd. Further, as will be disclosed hereinafter, other elements such as selected rare earths, manganese, and charge compensators may be substituted in FAP.

BRIEF DESCRIPTION OF THE DRAWINGS

For a better understanding of the invention, reference is made to the drawings, in which.

DESCRIPTION OF THE PREFERRED EMBODIMENTS

Figure 1:
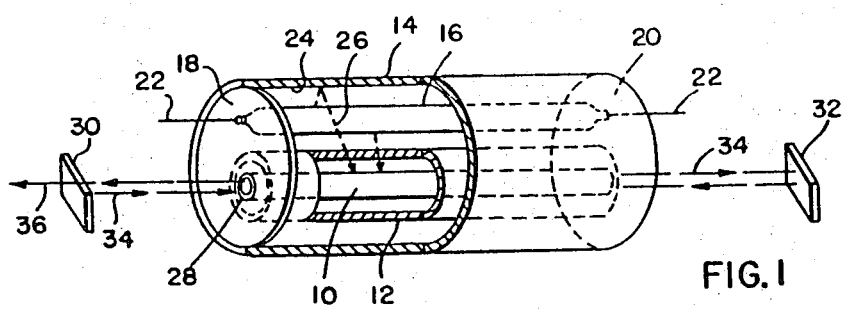
FIG. 1 is a perspective view, partly broken away, of an apparatus using a laser rod.

There is illustrated a laser in FIG. 1, wherein a rod-shaped crystal 10 is disposed within a cylindrical light filter 12 which in turn is mounted within a cylindrical reflector 14. An elongated power supply lamp 16 is mounted within the cylinder 14, the lamp 16 being substantially parallel with the crystal 10. Opposite ends of the cylinder 14 are closed by end panels 18 and 20.

The crystal 10, the tube 12, and the lamp 16 are substantially coextensive with the length of cylinder 14 and extend between the opposite end panels 18 and 20. The lamp 16 is provided with lead wires 22 extending from opposite ends thereof to a suitable power supply which is not shown. As an example, the lamp 16 is a xenon-filled flash lamp of 75 mm arc length, and 5 mm. inside diameter. The light filter 12 may be a glass tube for filtering out selective wavelengths of the pump light such as ultraviolet waves which are detrimental to laser action. Examples of suitable glasses are quartz and borosilicate glass sold under the trademark of Pyrex. The inner surfaces of the cylinder 14 as well as of the end panels 18 and 20 have a reflective aluminized surface 24 such that light emanating from the lamp 16 is reflected to the crystal 10 in a manner shown by the broken lines 26. It is preferred that all light entering the crystal 10 pass through the filter 12.

Each end panel 18 and 20 is provided with an opening 28 which is aligned with the end of the crystal 10. Reflective means are associated with each end of the rod crystal 10, for instance a pair of mirrors 30 and 32 are disposed in alignment with the axis of the crystal 10, the mirror 30 being partially reflective and partially transmittive and the mirror 32 being totally reflective of laser beams 34 projected from the ends of the crystal 10 to the mirrors. As a result of the partial reflectivity of the mirror 30, some of the beams 34 pass through the mirror as shown at 36. Alternately the ends of rod crystal 10 can be approximately silvered to effect the same result.

In accordance with the present invention, the rod-shaped crystal 10 is a single crystal of fluorapatite $Ca_5(PO_4)_3F(FAP)$ which is doped with neodymium. A technique for making the single crystal is that commonly called the Czochralski method and involves the wetting of a seed crystal by the molten FAP salt and slowly crystallizing the salt on the seed as the seed crystal is withdrawn. For fluorapatite, the molten liquid is held in a container of iridium or other nonreactive noble metal or alloy with melting points in excess of 1,750° C. The seed crystal, while being pulled, is rotated at from 10 to 150 r.p.m. and withdrawn from the melt at rates between 1 and 8 mm. per hour. However, pull and rotation rates faster and slower than those indicated may be suitable for growing laser crystals. After a crystal is prepared, it is then ground and polished to the desired dimension to provide a cylindrical rod with its ends polished to optical quality, the ends being precisely parallel to each other, and perpendicular to the rod axis, as is well known.

The laser crystal 10 in accordance with the invention comprises crystalline calcium fluorophosphate, $Ca_5(PO_4)_3F$, which is the mineral fluorapatite, (FAP). Fluorapatite as a host material may be converted to a material capable of the production of laser action by the addition of a dopant to the material, such dopants consisting of ions of the trivalent rare earth $4f$ type elements including particularly europium, terbium, holmium, thulium, erbium, neodymium, praseodymium, and ytterbium. Neodymium has proven to be outstanding. The addition of neodymium or any other dopant from the group of rare earth elements is made as a substitute for a minor portion of the calcium in fluorapatite.

A crystal of the halophosphate of the apatite structure may be prepared in any feasible manner at an elevated temperature as is indicated by one of the formulas:

(1) $3Ca_3(PO_4)_2 + CaF_2 \longrightarrow 2Ca_5(PO_4)_3F$, or (2) $3CaCO_3 + 6CaHPO_4 + CaF_2 \longrightarrow 2Ca_5(PO_4)_3F + 3H_2O + 3CO_2$ Reaction (2) is preferred. Intermediate reactions may occur, but the foregoing formulas represent the basic ultimate reactions.

The dopant ion, $Nd^{3+}$, is incorporated by replacement of calcium ions in either the phosphate or the fluoride reactants. Thus, $Nd_2O_3$ or $NdF_3$ may be substituted for a part of the $CaF_2$ or $CaCO_3$ or combinations thereof in the above reactions. Other neodymium materials such as $Nd_2(C_2O_4)_3$, $Nd_2(SO_4)_3$, and $Nd_2(PO_4)_3$ may be used to produce a useful laser crystal.

However, the amount of neodymium need not be added in stoichiometric proportions substituting for calcium so long as the resultant crystal is essentially the apatite structure.

EXAMPLE I

A typical weight radio for materials used to prepare a crystal of FAP:Nd is:

| | |
|---|---|
| $CaHPO_4$ | 44.348 g. |
| $Nd_2O_3$ | 1.802 g. |
| $CaF_2$ | 4.179 g. |
| $CaCO_3$ | 15.000 g. |

These finely divided materials are admixed and melted together at about 1,700° C. until completely reacted. A single crystal is pulled by the Czochralski method. The above melt composition contains a nominal neodymium doping of about 2 atom percent but the resultant crystal contains a lower concentration of neodymium ($Nd^{3+}$) in the typical hexagonal crystal structure of apatite.

In a similar manner the oxide or carbonate of europium, terbium, holmium, thulium, erbium, praseodymium, and ytterbium can be substituted for a part of or all of the neodymium oxide in example I.

In general the neodymium doped fluorapatite has the following nominal formula:

$$Ca_{5 13x/2}Nd_x(PO_4)_3F,$$

where $x$ has a value of from 0.001 to 0.2. For laser use, the optimum value of $x$ is 0.05 to 0.1. For example, where $x=0.06$, the formula is $Ca_{4.91}Nd_{0.06}(PO_4)_3F$.

Figure 2:
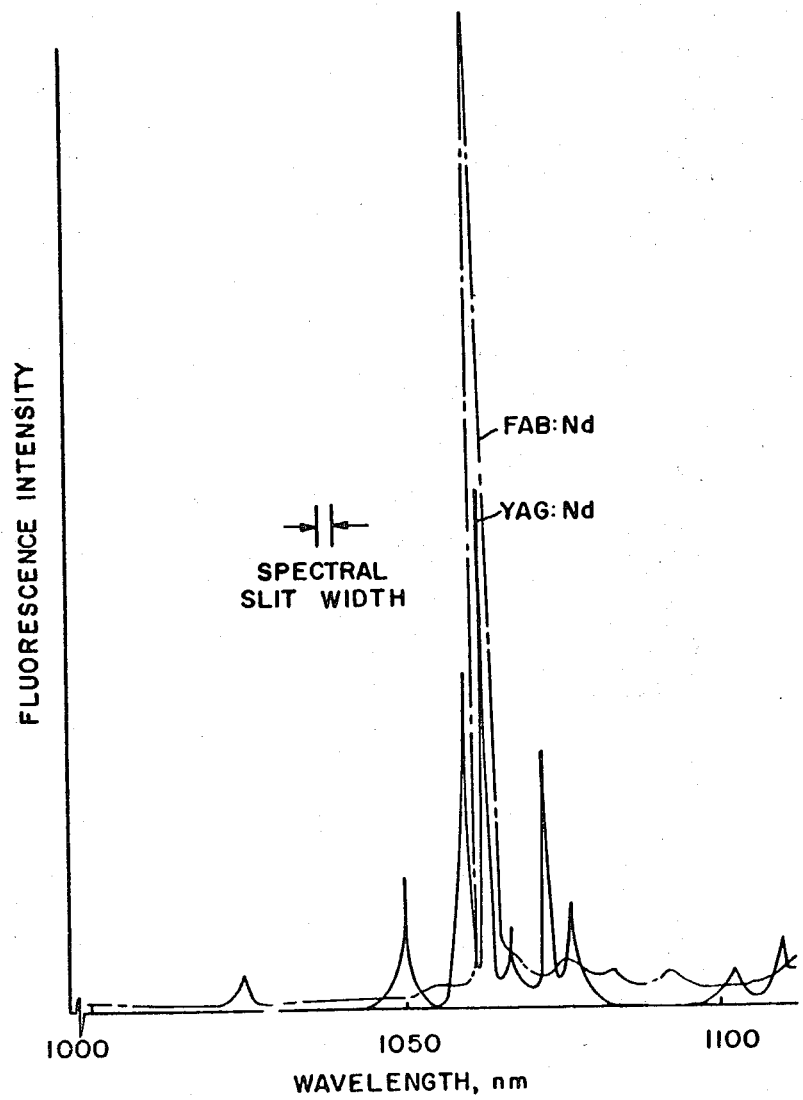
FIG. 2 is a graph showing the fluorescence intensity versus wavelength of the emission of neodymium in fluorapatite and in yttrium aluminum garnet.

The fluorescence spectra of neodymium in crystals of FAP and YAG are illustrated in FIG. 2. The FAP:Nd 0.4 percent spectrum is characteristic of the spectra for the electric field perpendicular to the c-axis of the crystal ($E \perp c$). The spectra for $E \| c$ is very similar except that the principal emission line is even more intense (by about 2.5 times) compared to the other lines. The fluorescence spectra of Nd show that in FAP the emission is somewhat unique compared to Nd emission in YAG in that a much larger fraction of the emission is found in a single line. The FAP:Nd line is located at 1.0629 $\mu$ and is about 6 Angstroms wide for $E \| c$. The internal emission efficiency at 1.0629 $\mu$ for FAP:Nd 0.4 percent for $E \| c$ is 2.6±0.3 times greater than that of YAG:Nd 1.5 percent at 1.0648 $\mu$. The YAG:Nd line is 6.5 Angstroms wide and is less intense. Thus, the spectral efficiency at room temperature is about 2.6 times greater for $Nd^{3+}$ in FAP than in YAG. The stimulated emission gain for a given rate of absorbing energy will be correspondingly greater for FAP than YAG. The $Nd^{3+}$ absorption and excitation spectra are similar for the two materials although the absorption in FAP is somewhat greater than in YAG. For the same cavity losses the continuous wave threshold of a FAP:Nd laser rod should be a maximum of one-third that of the same size YAG:Nd rod.

In order to maintain electroneutrality without formation of lattice vacancies an additional element or elements may be added to compensate for the valence difference between calcium and neodymium. Thus, the substitution of a trivalent rare earth ion in a divalent calcium site requires charge compensation by the addition of either a monovalent cation or a divalent anion in the calcium or fluoride sites, respectively. Suitable monovalent ions for every neodymium substitution in a calcium site include at least one of the alkali metals such as lithium, sodium, potassium, and rubidium. The ionic radii of the other metals in the alkali group, namely cesium and francium, are believed to be too large for substitution in the calcium site. Lithium, sodium, potassium, and rubidium is added as a charge compensator for calcium in an amount up to the mole proportion of the neodymium present. Because its ionic size is substantially equal to that of calcium, sodium is the preferred element for substitution to obtain the required charge compensation. The nominal formula for the laser material which is doped with neodymium and charge compensated by monovalent ions is as follows:

$M_xCa_{5-2x}Nd_x(PO_4)_3F$, where M is lithium, sodium, potassium, and/or rubidium, and $x$ has a value of from 0.001 to 0.2.

The reaction to produce alkali metal compensated FAP:Nd is carried out as in example I. For a sodium-compensated typical charge for the initial melt, the following is exemplary:

| | |
|---|---|
| $CaCO_3$ | 15.000 g. |
| $CaHPO_4$ | 47.760 g. |
| $CaF_2$ | 4.501 g. |
| $Nd_2O_3$ | 1.939 g. |
| $Na_2CO_3$ | 0.611 g. |

When melted and crystallized as in example I this gives a nominal composition of:

$$Ca_{4.80}Nd_{0.10}Na_{0.10}(PO_4)_3F.$$

Similarly, lithium carbonate, potassium carbonate, and rubidium carbonate can be substituted for the sodium carbonate individually or in combination. Obviously other oxygen containing compounds of the alkali metals can be substituted.

Another way to charge compensate the neodymium doped crystal is to partially replace the fluoride ions with a divalent anion such as oxygen. The general formula for the crystal having oxygen ions partially replacing the fluorine ions is:

$Ca_{5-x}Nd_x(PO_4)_3F_{1-x}O_x$, where $x$ varies from 0.001 to 0.2; the optimum value of $x$ being between 0.05 and 0.1. Oxygen may be conveniently added as $Nd_2O_3$.

A specific example of a crystal of fluorapatite doped with neodymium and charge compensated with oxygen is:

$$Ca_{4.94}Nd_{0.06}(PO_4)_3F_{0.94}O_{0.06}.$$

Compensation to maintain electroneutrality in the crystal may occur in other ways, such as by the presence of calcium vacancies or interstitial fluoride ions, which is self compensation. Self-compensation of the crystal, however, is undesirable as an alternative to charge compensation where a monovalent ion such as sodium is added to the calcium site or where a divalent anion such as oxygen is added as a partial substitute for the fluorine ion to keep the ionic charges in the crystal in balance. It has been found that where such cations or anions are not added as charged compensators and the crystal is permitted to self compensate by induced vacancies in the lattice, the crystal ultimately develops a color center which reduces the optical properties and overall efficiency of the crystal.

Though calcium is the preferred alkaline earth metal in the FAP, it is understood that other divalent metals including magnesium, strontium, and barium may be used to replace a part or all of the calcium. Table I lists these alkaline earth metals together with their atomic size in Angstroms.

TABLE I

| Alkaline Earth Metal | Goldschmidt's Ionic Radii |
|---|---|
| Magnesium | 0.78 A |
| Calcium | 1.06 A |
| Strontium | 1.27 A |
| Barium | 1.43 A |

From the table, it is evident that magnesium is smaller than calcium by 20 percent for which reason it is difficult to completely substitute magnesium in the calcium site in apatite while retaining all its properties. However, the alkaline earth metals either individually or in combination may be substituted for calcium in varying amounts and still retain the TABLE II.—LASER TESTS CONDUCTED WITH ONE YAG:Nd ROD AND THREE FAP:Nd RODS

| Laser material | Rod size, inch | Gain coef. per pump energy $k_{r-1}$ cm. joules | Maximum slope efficiency, percent | Lowest threshold (99–95% relf.), joules |
|---|---|---|---|---|
| YAG:Nd 1.5% (grown Dec. 1965) | 0.24″ x 1.48″ | 0.011 | 1.6 | 5 |
| FAP:Nd 1.1% | 0.178″ x 1.75″ | 0.016 | 1.2 | 7.6 |
| FAP:Nd 1.4% | 0.24″ x 1.73″ | 0.025 | 2.1 | 4 |
| FAP:Nd 1.3% | 0.25″ x 2.0″ | 0.017 | 2.4 | 5.6 | apatite structure. For example, $Sr_5(PO_4)_3$ has the apatite crystal structure and is suitable as a laser host material.

Figure 3:
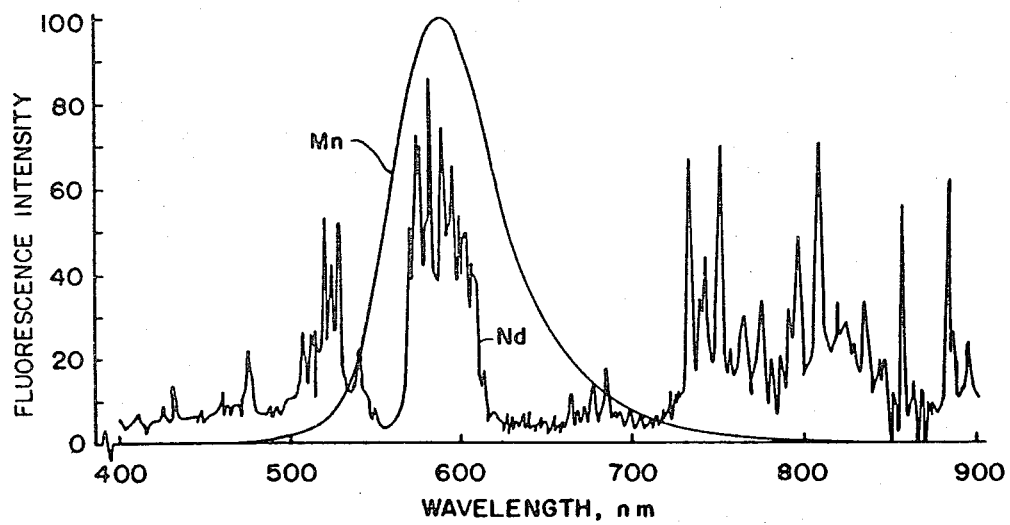
FIG. 3 is a graph of the fluorescence intensity versus wavelength of the emission of manganese ions and of neodymium absorption in fluorapatite at room temperature.

In accordance with another aspect of the invention, which is being specifically claimed in a copending application Ser. No. 583,760, the efficiency of the laser may be improved by the simultaneous or double doping of fluorapatite with both manganese and neodymium. As shown in FIG. 3, the fluorescence spectrum of manganese overlaps the absorption spectrum of neodymium. Manganese absorbs energy in spectra regions where neodymium does not absorb even though there are some regions where the absorption spectra for both metals are identical or overlapping. The energy absorbed by manganese may be subsequently transferred to the neodymium ions due to the overlap shown in FIG. 3 and thereby enhance the output energy of these ions.

Manganese can be substituted directly in the calcium site without the use of lattice compensation whereas, the substitution of the trivalent rare earth ion such as neodymium in a divalent calcium site requires charge compensation to maintain electroneutrality. Any combination of the previously discussed compensating means may be employed in a process where neodymium and manganese are employed. For oxygen compensation the following general formula applies to the manganese-neodymium doped crystals:

$Ca_{5-x-y}Nd_xMn_y(PO_4)_3F_{1-x}O_x$, where $y$ has a value of from 0.0 up to the solubility limit of manganese, and $x$ has a value of from 0.001 to 0.2.

Accordingly, crystals of neodymium doped fluorapatite may be sensitized by incorporating up to 10 mole percent of manganese replacing an equimolar quantity of calcium. Other divalent transition metal ions may also be used to sensitize neodymium doped FAP, and particularly vanadium and titanium, both of which like manganese have a valence of 2 and any one or any two or all three of manganese, vanadium, and titanium may be directly substituted for a part of the calcium.

The use of manganese with neodymium to produce FAP:Mn,Nd may produce a significant improvement in the efficiency over FAP:Nd both in continuous and pulse lasers. Manganese introduces effective pumping bands at wavelengths not absorbed directly by the neodymium. Fluorapatite is an extremely attractive host for manganese sensitization because a high concentration of manganese be substituted for calcium. Moreover, fluorapatite which is doped with neodymium and manganese may also be charge compensated by both cations and anions. The general formula for such a material is $Ca_{5-x-y-w}Nd_xMn_yM_w(PO_4)_3F_{1-z}O_z$, where $x$ has a value of from 0.001 to 0.2, $y$ has a value of from 0.0 up to the solubility limit of manganese, $z$ has a value of from 0.0 up to the limit of lattice stability, $w$ has a value of from 0.0 to that of $x$, and M is at least one of the alkaline earth metals selected for the group consisting of lithium, sodium, potassium, and rubidium. The charge neutrality must be maintained, which requires that $x=w+z$.

The following example is further illustrative of the present invention:

EXAMPLE II

The performance of laser crystals of fluorapatite doped with varying amounts of neodymium (FAP:Nd) was compared with that of the presently best known crystal material, i.e. yttrium aluminum garnet doped with neodymium (YAG:Nd). One YAG crystal doped with 1.5 mole percent neodymium having a rod size of 0.25-inch diameter and a length of 1.48 inches was prepared and tested. Likewise, three crystals of FAP doped with neodymium were prepared and tested. One FAP crystal contained approximately 1.3 mole percent neodymium and had a diameter of 0.25 inch and a length of 2.0 inches. The second FAP crystal contained approximately 1.1 mole percent neodymium and had a diameter of 0.178 inch and a length of 1.75 inches. The third FAP crystal contained approximately 1.4 mole percent neodymium, had a diameter of 0.24 inch and a length of 1.73 inches. The parameters and test results of the YAG:Nd crystal and of the three FAP:Nd crystals are listed in table II.

Figure 4:
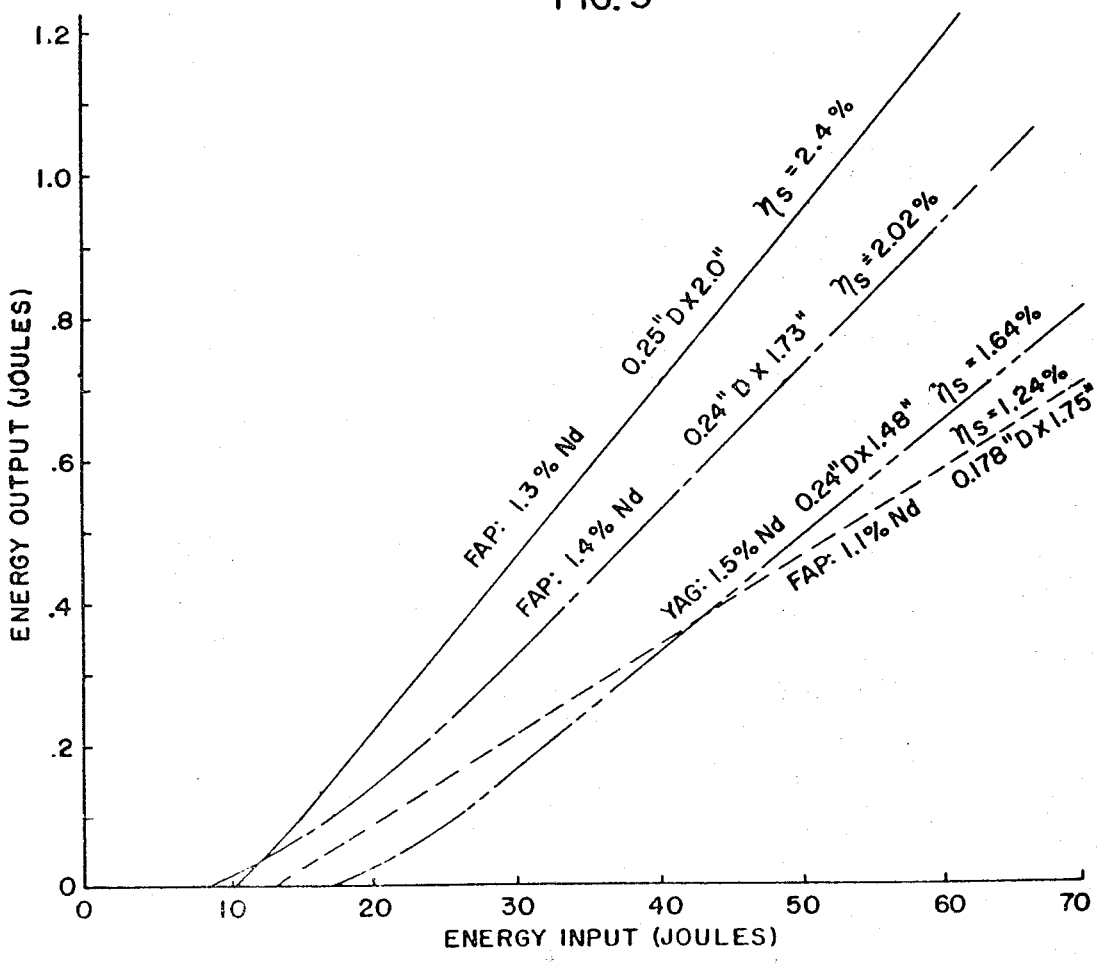
FIG. 4 is a graph of energy output versus energy input of fluorapatite doped with varying amounts of neodymium and of yttrium aluminum garnet doped with neodymium.

The gain coefficient per pumped energy shows a marked improvement for the FAP:Nd crystals over that of the YAG:Nd crystal. Finally, the efficiency of the FAP:Nd crystals exceeds that of the YAG:Nd crystal and the results of this test are shown in FIG. 4 where the energy input in joules is plotted against the energy output. In FIG. 4, the maximum slope efficiency of the YAG:Nd crystal is 1.65 percent which is substantially less than the latest prepared FAP:Nd crystal having an efficiency slope of 2.4 percent.

Accordingly, the fluorapatite doped with neodymium is an improvement over prior known laser materials such as yttrium aluminum garnet for decreased laser threshold power, increased gain, and improved efficiency for use in lasers which oscillate at about 1.06 μ wavelength. Moreover, fluorapatite doped with neodymium has 3 to 5 times higher gain than yttrium aluminum garnet doped with neodymium for the same energy absorbed. Thus, it is easier to stimulate laser action in the fluorapatite than in the garnet.

What we claim is:

1. A laser comprising, in combination, a crystal material having the formula: $Ca_{5-3x/2}Nd_x(PO_4)_3F$, where $x$ has a value of from about 0.001 to about 0.2, and means for exciting the crystalline material.

2. The laser of claim 1 in which reflective means are operatively disposed with said crystal material.

3. A laser comprising, in combination, a crystal material having the formula: $Ca_{5-x-w}Nd_xM_w(PO_4)_3F$, where $x$ has a value of from about 0.001 to about 0.2 $w$ has a value of up to and including that of $x$, M is at least one member of the group of lithium, sodium, potassium, and rubidium, and means for exciting the crystalline material.

4. The laser of claim 3 in which reflective means are operatively disposed with said crystal material.

5. A laser comprising, in combination, a crystal material having the formula: $Ca_{5-x}Nd_x(PO_4)_3F_{1-x}O_x$, where $x$ has a value of from about 0.001 to about 0.2 and means for exciting the crystalline material.

6. The laser of claim 5 in which reflective means are operatively disposed with said crystal material.

7. A laser comprising, in combination, a crystal material having the formula: $Ca_{5-x-w}Nd_xM_w(PO_4)_3F_{1-z}O_z$, where $x$ has a value of from about 0.001 to about 0.2, $w$ has a value of up to that of $x$, and $z$ has a value of up to the limit of lattice stability of the crystal, and M is at least one member of the group of lithium, sodium, potassium, an rubidium, and means for exciting the crystalline material.

8. The laser of claim 7 in which reflective means are operatively disposed with said crystal material.

* * * * *